(12) United States Patent
Gullicksen et al.

(10) Patent No.: US 11,660,528 B2
(45) Date of Patent: May 30, 2023

(54) POPULATING VIRTUAL OBJECTS IN PHYSICAL ENVIRONMENTS

(71) Applicant: Reavire, Inc., Mountain View, CA (US)

(72) Inventors: Jeff Gullicksen, Mountain View, CA (US); Wil Fabrick, San Francisco, CA (US); Ameya Lonkar, San Jose, CA (US)

(73) Assignee: Reavire, Inc., Mountain View, CA (US)

( * ) Notice: Subject to any disclaimer, the term of this patent is extended or adjusted under 35 U.S.C. 154(b) by 86 days.

(21) Appl. No.: 17/200,763

(22) Filed: Mar. 12, 2021

(65) Prior Publication Data
US 2021/0283497 A1    Sep. 16, 2021

Related U.S. Application Data

(60) Provisional application No. 62/988,726, filed on Mar. 12, 2020.

(51) Int. Cl.
| | | |
|---|---|---|
| *A63F 13/22* | (2014.01) | |
| *A63F 13/25* | (2014.01) | |
| *G06T 19/20* | (2011.01) | |
| *G06T 19/00* | (2011.01) | |

(52) U.S. Cl.
CPC .............. *A63F 13/25* (2014.09); *A63F 13/22* (2014.09); *G06T 19/006* (2013.01); *G06T 19/20* (2013.01)

(58) Field of Classification Search
CPC .......... A63F 13/25; A63F 13/22; G06F 19/20; G06F 19/006
See application file for complete search history.

(56) References Cited

U.S. PATENT DOCUMENTS

| | | | | |
|---|---|---|---|---|
| 7,394,459 | B2* | 7/2008 | Bathiche | G06F 3/011 |
| | | | | 715/702 |
| 8,419,545 | B2* | 4/2013 | Yen | A63F 13/847 |
| | | | | 463/42 |
| 8,932,138 | B2* | 1/2015 | Wang | A63F 13/795 |
| | | | | 463/9 |
| 8,944,911 | B2* | 2/2015 | Avent | A63F 13/34 |
| | | | | 463/31 |
| 9,898,864 | B2* | 2/2018 | Shapira | G06T 19/006 |
| 10,444,320 | B2 | 10/2019 | Gullicksen | |
| 10,503,351 | B2 | 12/2019 | Gullicksen | |
| 10,921,878 | B2* | 2/2021 | Noris | G06F 3/011 |
| 2009/0005140 | A1* | 1/2009 | Rose | A63F 13/216 |
| | | | | 463/40 |
| 2010/0093438 | A1* | 4/2010 | Baszucki | A63F 13/12 |
| | | | | 463/42 |

(Continued)

FOREIGN PATENT DOCUMENTS

WO    2019172874    9/2019

*Primary Examiner* — David L Lewis
(74) *Attorney, Agent, or Firm* — BainwoodHuang

(57) ABSTRACT

A technique for implementing computerized games includes providing multiple gameplay spaces of a computerized game and receiving a model of a physical environment in which the game is to be played. The technique proceeds by fitting the gameplay spaces of the game to the model, such as by placing the gameplay spaces and their respective virtual objects into respective portions of the model, thus actualizing the game to the particular environment in which the game is to be played.

19 Claims, 6 Drawing Sheets

(56) References Cited

U.S. PATENT DOCUMENTS

| | | | | |
|---|---|---|---|---|
| 2010/0287485 A1* | 11/2010 | Bertolami | ............... | G06F 3/011 |
| | | | | 715/764 |
| 2010/0321389 A1* | 12/2010 | Gay | ........................ | G06T 17/00 |
| | | | | 345/427 |
| 2011/0246908 A1* | 10/2011 | Akram | ............... | H04N 21/4788 |
| | | | | 715/752 |
| 2013/0196772 A1* | 8/2013 | Latta | ...................... | G06Q 10/00 |
| | | | | 463/42 |
| 2014/0204077 A1* | 7/2014 | Kamuda | ............... | A63F 13/497 |
| | | | | 345/419 |
| 2016/0041391 A1* | 2/2016 | Van Curen | ............ | A63F 13/211 |
| | | | | 345/633 |
| 2016/0350973 A1* | 12/2016 | Shapira | ................... | G06F 3/011 |
| 2017/0270711 A1 | 9/2017 | Schoenberg | | |
| 2018/0059901 A1 | 3/2018 | Gullicksen | | |
| 2018/0063154 A1 | 3/2018 | Gullicksen | | |
| 2019/0015747 A1* | 1/2019 | Thompson | ............... | A63F 13/53 |
| 2019/0383897 A1 | 12/2019 | Gullicksen et al. | | |
| 2019/0384058 A1 | 12/2019 | Gullicksen et al. | | |
| 2020/0005541 A1* | 1/2020 | Preston | ................. | A63F 13/792 |

* cited by examiner

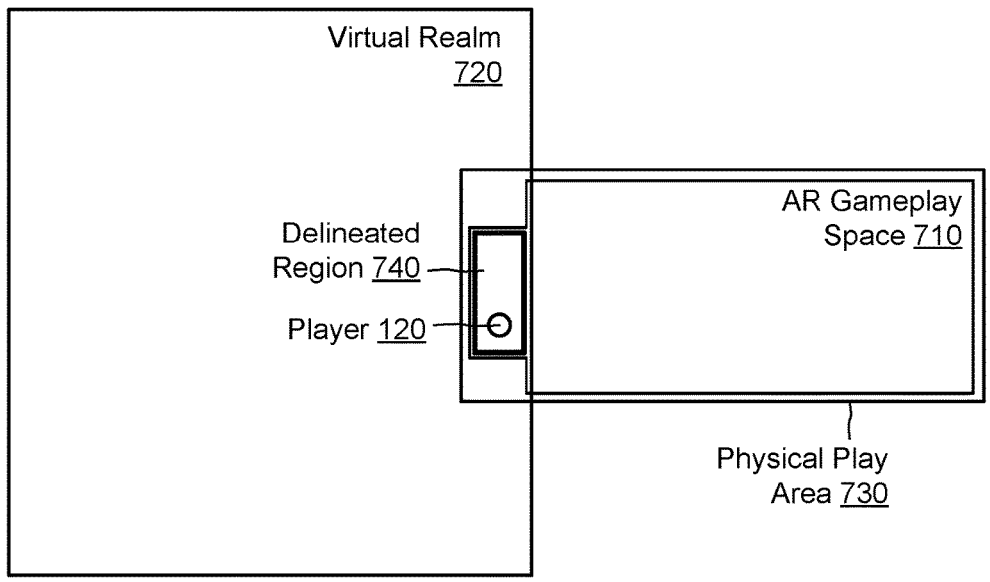
FIG. 7a
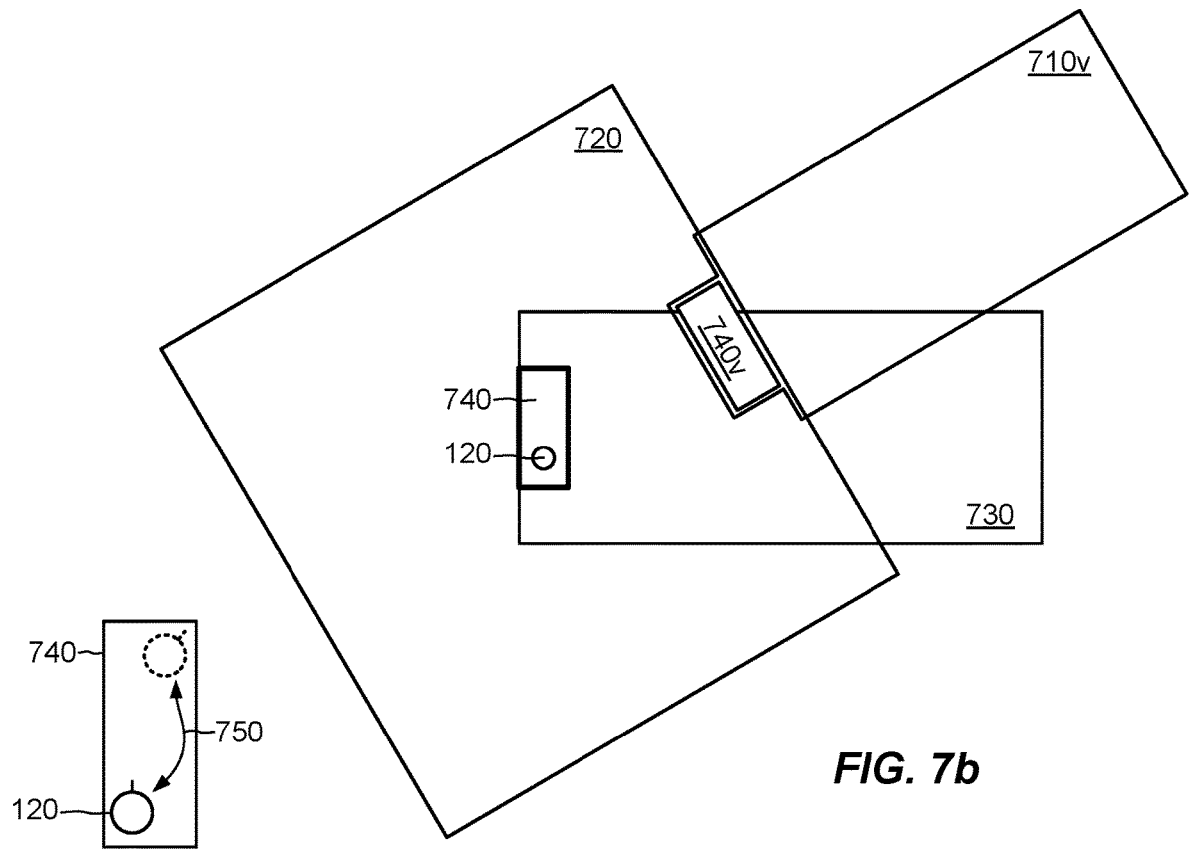
FIG. 7b
FIG. 7c

POPULATING VIRTUAL OBJECTS IN PHYSICAL ENVIRONMENTS

CROSS-REFERENCE TO RELATED APPLICATIONS

This application claims the benefit of U.S. Provisional Application No. 62/988,726, filed Mar. 12, 2020, the contents and teachings of which are incorporated herein by reference in their entirety.

BACKGROUND

VR (virtual reality) enables users to enter immersive, virtual environments without leaving the comfort and safety of their physical environments. Users of VR can move through virtual spaces and interact with rendered content, such as 3D (three dimensional) representations of objects, scenery, and other users. Users may engage with VR content using VR headsets and hand-held controllers. A well-known example of a VR headset is the Oculus Rift, available from Oculus VR, LLC.

AR (augmented reality) allows users to continue to see their physical environments through display screens while additional content is superimposed. AR thus provides a vehicle for adding synthetic content to users' normal views of their environments, allowing placement of synthetic objects at locations referenced to objects in the users' physical environments. An AR headset may scan local surroundings many times per second to learn the locations of walls, ceilings, floors, and objects. As it does so, the AR headset displays holograms, i.e., 3D representations of synthetic objects, via transparent or semi-transparent display screens located in front of a user's eyes, such that the holograms appear superimposed on objects in the user's natural environment. Displayed holograms may appear stationary in physical space, even as the user moves, or they may move through the environment in natural-looking ways. AR technology thus provides a vehicle for displaying synthetic content alongside actual, physical objects and creates the illusion that holograms are part of the physical environment. A well-known example of an AR headset capable of such operation is the Microsoft HoloLens, which is available from Microsoft Corporation of Redmond, Wash.

SUMMARY

Current 3D games for standard VR consoles are created by game developers who first design a 3D environment and then place objects within the environment to be mapped at runtime, e.g., based on a player's progress and traversal through the game. 3D games for standard AR consoles are also available. Unfortunately, however, such games are limited in their ability to adapt to physical surroundings. For example, an AR board game may search for a tabletop or other horizontal surface on which to place holograms of game boards and game pieces. If no suitable horizontal surface can be found, the game simply fails out. Other games may search for vertical surfaces, floors, or ceilings on which to place holograms. Some games may use simple rules for hologram placement, but such rules are limited in their operation. For example, a game may attempt to place holograms in a room selected by the user, but the game is then limited to the space the user selects. What is needed is a more flexible approach to populating virtual objects in physical environments.

To address this need at least in part, an improved technique provides multiple gameplay spaces of a computerized game and receives a model of a physical environment in which the game is to be played. The technique proceeds by fitting the gameplay spaces of the game to the model, such as by placing the gameplay spaces and their respective virtual objects into respective portions of the model, thus actualizing the game to the particular environment in which the game is to be played.

Advantageously, the improved technique is adaptable to a wide range of physical structures. Once the gameplay spaces have been fitted to the model, for example, players may move around to different gameplay spaces by moving from room to room, potentially turning an entire house or other space into a game zone.

Certain embodiments are directed to a method of implementing computerized games. The method includes providing multiple gameplay spaces in a game, the gameplay spaces describing respective game environments and including respective sets of virtual objects. The method further includes receiving a model of a physical environment in which the game is to be played and fitting the gameplay spaces of the game to the model of the physical environment, including placing the gameplay spaces and the respective sets of virtual objects into respective portions of the model of the physical environment.

In some examples, the model of the physical environment includes multiple sections corresponding to respective physical areas of the physical environment, and fitting the gameplay spaces to the model includes placing virtual objects of a first gameplay space into a first set of the sections and placing virtual objects of a second gameplay space into a second set of the sections.

In some examples, the second set of sections is at least partially distinct from the first set of sections.

In some examples, the method further includes rendering the first gameplay space to a first player of the game while simultaneously rendering the second gameplay space to a second player of the game.

According to some examples, the first set of the sections overlaps the second set of sections in at least one shared section.

In some examples, said at least one shared section includes a particular shared section, and the act of rendering the first gameplay space to the first player while simultaneously rendering the second gameplay space to the second player is performed while the first player and the second player are both physically present in a region of the physical environment represented by the particular shared section, such that the first player and the second player can see different gameplay spaces at the same time in the same shared section.

In some examples, the game provides an additional gameplay space having an additional set of virtual objects, and the method further includes attempting to fit the additional gameplay space to the model of the physical environment and, in response to failing to fit the additional gameplay space to the model of the physical environment, rendering a VR version of the additional gameplay space, the VR version providing a player with a fully synthetic version of the additional gameplay space.

In some examples, fitting the gameplay spaces to the model includes placing virtual objects in accordance with a set of rules that specify relative positions of virtual objects.

In some examples, the method further includes specifying a set of focal objects in a gameplay space. The set of focal objects provide a skeleton on which virtual objects of the gameplay space can be placed.

According to some examples, the set of focal objects is defined relative to features of a generalized room. Fitting the gameplay spaces to the model includes (i) associating the set of focal objects with actual features of the physical environment and (ii) placing the virtual objects of the gameplay space relative to the features associated with the focal objects.

In some examples, the method further includes providing a transition between a first gameplay space of the game and a second gameplay space of the game, the transition providing an animated path for a player to follow from a first part of the physical environment in which the first gameplay space is rendered to a second part of the physical environment in which the second gameplay space is rendered.

In some examples, a gameplay space provided by the game includes a delineated region that provides a transit point for a player between the gameplay space and a virtual realm.

According to some examples, while the player is physically disposed within the delineated region, the method further includes responding to VR control input from the player to virtually move the virtual realm relative to the player, such that the player has the impression of moving through the virtual realm.

In some examples, virtually moving the virtual realm relative to the player includes moving (i) a virtual image of the gameplay space and (ii) a virtual image of the delineated region relative to the player.

According to some examples, the method further includes, while the player is playing the game in the virtual realm, responding to VR control input from the player to virtually move the virtual image of the delineated region back to the delineated region. Once the virtual image of the delineated region has been moved back to the delineated region, the method further includes receiving control commands from the player based on body position and movements of the player to move about the gameplay space off of the delineated region.

In some examples, the method further includes, while the player is physically positioned within the delineated region and is playing within the virtual realm, translating physical positions and movements of the player into control input within the virtual realm.

According to some examples, translating physical positions and movements of the player into control input includes translating input indicative of the player walking within the delineated region to corresponding walking of the player within the virtual realm.

In some examples, the method further includes presenting images of the VR realm to the player while the player is disposed within the gameplay space, such that the player can see the VR realm from within the gameplay space.

Other embodiments are directed to a computerized apparatus constructed and arranged to perform a method of implementing computerized games, such as the method described above. Still other embodiments are directed to a computer program product. The computer program product stores instructions which, when executed on control circuitry of a computerized apparatus, cause the computerized apparatus to perform a method of implementing computerized games, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

FIGS. 7a, 7b, and 7c show various aspects of an example delineated region, which acts as a transit point between an AR gameplay space and a virtual realm.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for implementing computerized games includes providing multiple gameplay spaces of a game and receiving a model of a physical environment in which the game is to be played. The technique proceeds by fitting the gameplay spaces of the game to the model, such as by placing the gameplay spaces and their respective virtual objects into respective portions of the model, thus actualizing the game to the particular environment in which the game is to be played.

Figure 1:
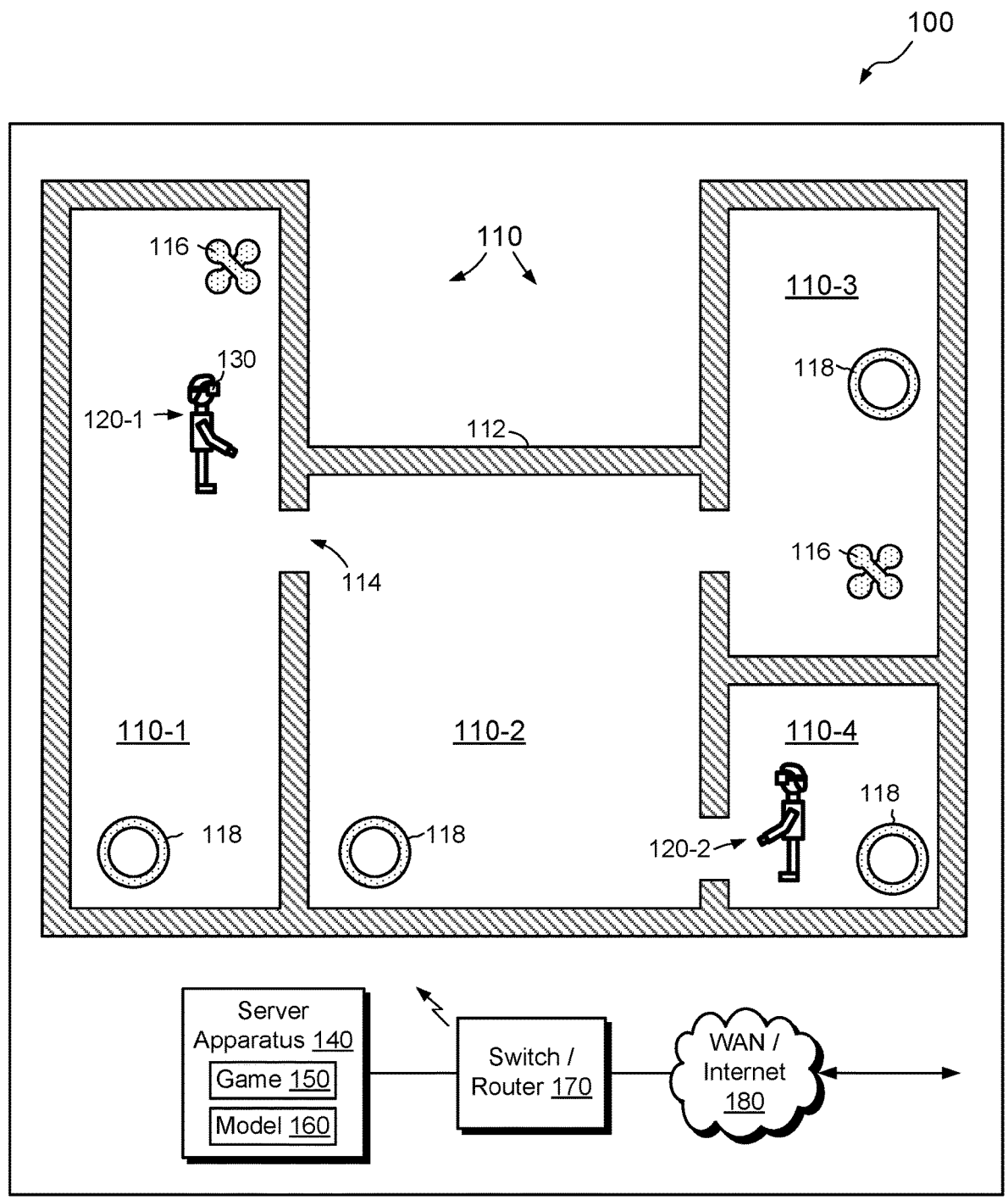
FIG. 1 is a top, plan view of an example environment in which the improved technique hereof can be practiced.

FIG. 1 shows an example environment 100 in which embodiments of the improved technique can be practiced. Here, a physical space or environment 110 includes various rooms 110-1, 110-2, 110-3, and 110-4, which may be separated by walls 112. The rooms may be connected by passageways 114, such as open doors or other openings. Persons, such as human players 120, may move around the space 110 and travel in and out of the various rooms. Although the space 110 is shown as a single-level structure, the space 110 may include any number of floors and may have an arbitrarily complex shape.

As further shown, the environment 100 includes a server apparatus 140, such as a computer, game console, or the like, as well as a switch/router 170, which may establish a local wireless network (e.g., Wi-Fi) within the environment 100. The switch/router 170 may be connected to a WAN 180 (wide area network), such as the Internet. In some examples, the server apparatus 140 may connect over the WAN 180 to similarly configured servers in other physical environments (e.g., houses, apartments, schools, etc.), for supporting multi-site games that involve multiple players at various sites. An example of multi-site gaming technology is described in U.S. Pat. No. 10,503,351, filed Jul. 21, 2017, the contents and teachings of which are incorporated herein by reference in their entirety.

As further shown in FIG. 1, the server apparatus 140 includes or otherwise has electronic access to a computerized game 150 and a model 160 of the physical environment 110. The game 150 may be a downloadable game application package. Alternatively, the game 150 may be installed from software media, e.g., from one or more DVDs, Blu-ray disks, or the like. Some portions of the game 150 may be installed from software media, whereas other portions may be downloaded over the Internet. The model 160 provides a simplified model of the physical environment, including, for example, floorplan information such as dimensions of rooms, hallways, various floors, and the like. Model 160 may also be referred to herein as an SVM (simplified virtual model). Examples of the model 160 are further described in the incorporated U.S. Pat. No. 10,503,351, where the model 160 is referred to as "map data." Although not specifically shown, the server apparatus 140 may further include processing circuitry and memory. The memory may include both volatile memory (e.g., RAM) and persistent memory (e.g., one or more disk drives, solid-state drives, or the like). The memory may store instructions which, when executed by the processing circuitry, cause the processing circuitry to carry out the various procedures and activities as described herein.

In example operation, the server apparatus 140 runs the game 150, and one or more players 120 participate in the game. The players 120 wear respective headsets 130, which are capable of connecting to the server apparatus 140, e.g., using Wi-Fi, Bluetooth, or the like, and of operating an AR (Augmented Reality) mode, e.g., by displaying 3D images of virtual objects overlaid on the physical environment. The players 120 are thus able to see the physical environment 110 and its contents through the headsets 130, while they are also able to see synthetic content superimposed on the physical environment 110. The headsets 130 operating in AR mode may render synthetic content such that it appears stationary, e.g., attached to walls or other surfaces, or so that it moves relative to the physical environment 110 in ways that appear natural. In an example, the headsets 130 are also capable of operating in a VR mode, in which the players' view of the physical environment 110 is replaced with entirely synthetic content. A suitable example of the headsets 130 includes the Microsoft HoloLens, which is capable of operating in both AR mode and VR mode.

In the example shown, rooms 120-1, 120-2, 120-3, and 120-4 implement various gameplay spaces of the game 150, where a gameplay space represents a particular scene and/or level of the game. A gameplay space may include virtual objects, such as holograms 116 and virtual portals 118. Different gameplay spaces may include different combinations of virtual objects, which make up the scene and/or level of those gameplay spaces.

Figure 2:
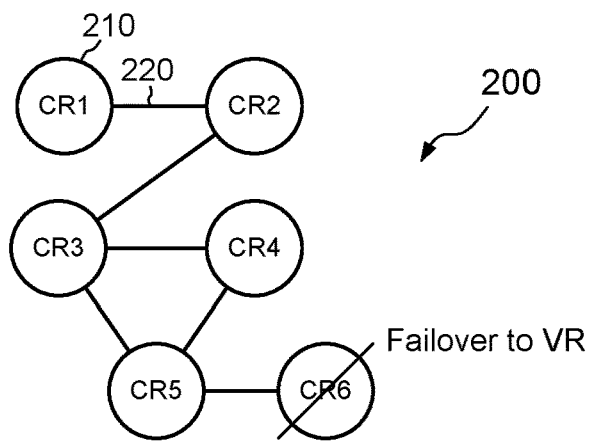
FIG. 2 is a block diagram of an example graph-connected map (GCM) having nodes that represent gameplay spaces of a game and edges that describe relationships among the gameplay spaces.

FIG. 2 shows additional information about gameplay spaces. Here, a GCM (graph-connected map) 200 provides an abstract representation of gameplay spaces 210 of the game 150. Gameplay spaces 210 are represented as nodes of the GCM 200, which may be connected via edges 220. Each node represents a respective gameplay space 210, and each edge 220 represents a defined transition between two gameplay spaces. Examples of transitions indicated by edges 220 include virtual tunnels (e.g., passageways through which players 120 must traverse to get from one gameplay space to another), fading out a current gameplay space and fading into another, virtual teleportation, and the like. The GCM 200 as depicted provides a simple example. GCMs for actual games are expected to include tens or hundreds of gameplay spaces 210.

One should appreciate that the GCM 200 is not intended to show a topographical map of gameplay spaces 210. Rather, the GCM identifies gameplay spaces 210 as nodes and identifies other gameplay spaces to which a player may transition via edges 220. Thus, for example, a player in the CR1 gameplay space may travel to CR2, but not directly to CR3. A player in CR3 may travel to CR2, CR4 or CR5. Proximity of nodes in the GCM does not imply physical proximity. In some cases, a player may need to walk a considerable distance to traverse an edge 220. Gameplay spaces 210 are labeled CR1-CR6 as they represent potential "coextensive realities" (CRs), i.e., gameplay spaces capable of being played in AR mode but additionally enabling different players to see different gameplay spaces in the same places at the same times.

Each gameplay space 210 typically has an associated collection of virtual objects. Gameplay spaces 210 may also have other properties, such as minimum sizes. Initialization or other operation of the game 150 may include attempting to fit the gameplay spaces 210 into the physical environment 110, e.g., by placing the gameplay spaces into various parts of the physical environment 110 in a manner that supports gameplay in AR mode. Given that placement of gameplay spaces 210 involves many constraints (e.g., sizes of spaces, numbers and sizes of virtual objects, edges 220, etc.), such placement is not guaranteed to succeed. In the event that placement of a gameplay space cannot be achieved in the physical environment 110 so as to support gameplay in AR mode, operation of that gameplay space 210 may fail over to VR mode, allowing that gameplay space to be played in VR rather than in AR. In the example shown, the game 150 has failed to fit CR6 to the physical environment 110, causing the gameplay space of CR6 to fail over to VR mode. In VR mode, the gameplay space is presented to the player via a headset 130 as an entirely simulated space, at least to the extent practicable given the state of AR headsets.

The GCM 200 is intended to be independent of any particular physical environment 110. During development, game designers may attempt to fit the GCM 200 to a large number of simulated spaces (e.g., simulated floorplans), iterating on the design of the GCM 200 until the GCM can be fit to a satisfactory percentage of such spaces. This design effort improves the probability that gameplay spaces can be realized in a typical house or apartment, such that players can experience gameplay spaces in AR mode as often as reasonably possible. Satisfactory VR versions of gameplay spaces are provided, however, e.g., one for each gameplay space 210, so that players are not impeded by the failure of the game to fit a gameplay space to the physical environment 110. The GCM 200 may be encoded within the game 150, but this is not required. For example, the game 150 may include constraints implied by the GCM but not the actual GCM itself.

Figure 3:
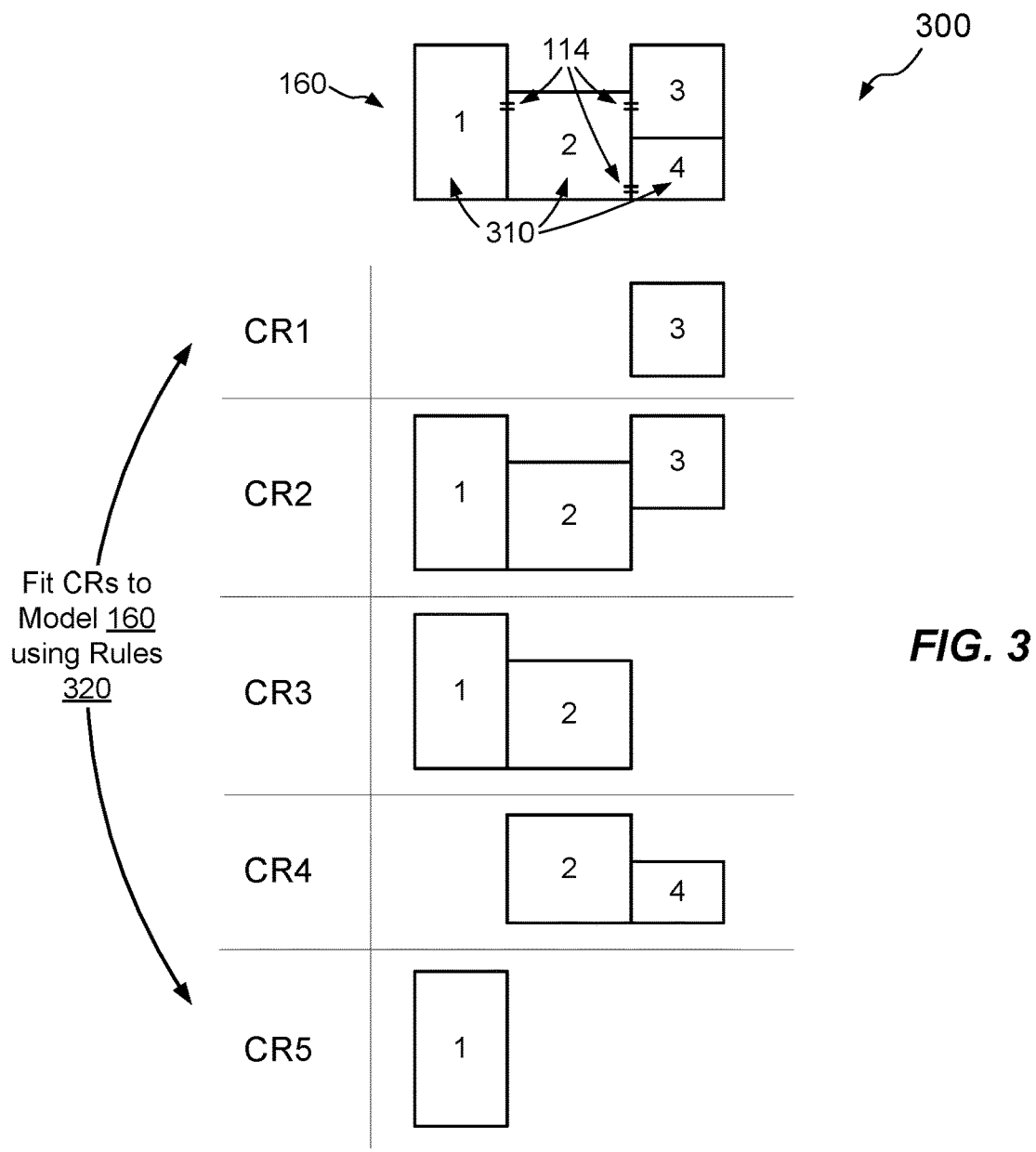
FIG. 3 is a diagram of an example fitting of the gameplay spaces of FIG. 2 to a model of a physical environment of FIG. 1.

FIG. 3 shows an example arrangement 300 in which gameplay spaces CR1-CR5 may be fitted to the model 160 of the physical environment 110. Here, the model 160 provides a simplified representation of the physical environment 110. As shown, the model 160 includes multiple sections 310, labeled 1-4, where each section 310 represents a room or other region of the physical environment 110. Sections 310 have the property that they are interconnected, i.e., it is possible to walk from any section to any other section, e.g., via the indicated passageways 114. In an example, sections 310 must be large enough to support a minimum configuration of objects. Thus, small closets or other areas may be excluded. Narrow hallways and staircases may also be excluded from sections 310, instead being characterized as connective spaces, i.e., areas that connect one or more sections 310 but are not sections themselves.

Fitting gameplay spaces 210 to the model 160 may involve assigning each gameplay space to one or more sections 310 in accordance with a set of rules 320, which may specify placement requirements or other constraints. We refer to this process of fitting a GCM to a model as "actualization." In the example shown, the game 150 assigns gameplay spaces to sections 310 as follows:

CR1 is assigned to Section 3;
CR2 is assigned to the combination of Sections 1, 2, and 3;
CR3 is assigned to the combination of Sections 1 and 2;
CR4 is assigned to the combination of Sections 2 and 4;
CR5 is assigned to Section 1.

Rules 320 may specify required relationships among virtual objects, such as "Object A is to the left of Object B" and "Object C is on top of Object A." Virtual objects may have required sizes, or required ranges of sizes. The number of virtual objects and their sizes and spatial relationships may thus make placement of all objects of a gameplay space feasible in some sections 310 (or groups of sections) but not in others. Game 150 may apply placement algorithms and optimizations to fit gameplay spaces 210 to sections 310, iterating if necessary and, if no feasible placement for a gameplay space can be achieved, failing over from AR mode to VR mode for that gameplay space. In FIG. 3, the game 150 fails to fit CR6 to any combination of sections 310, and thus CR6 is realized using VR. Given that CR6 can only be entered from CR5 (FIG. 2), CR5 may include a designated spot (one of the virtual objects of CR5) in which players may enter CR6 in VR mode.

As stated previously, each gameplay space 210 may represent a particular scene or level within the game 150. It is thus apparent that sections 310 of the model 160 may be reused by different gameplay spaces. For example, a player 120 in CR1 and standing in Section 3 may complete a level and transition to CR2. Upon implementing the transition, the game 150 may change the scene as presented through the player's headset 130 to something different. The game 150 might present CR1 as a laboratory and may then present CR2 as a forest, for example. This may happen without the player moving from Section 3. As the player 120 progresses through the game 150, the player virtually experiences different scenes in the same physical regions. Operation becomes even richer and more complex when multiple players are involved.

Figure 4:
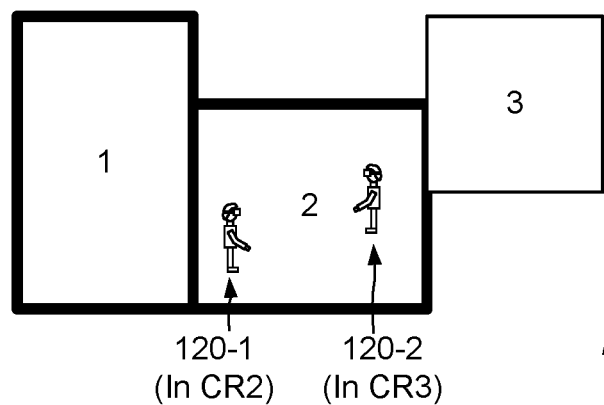
FIG. 4 is a top, plan view of example sections of the model of the physical environment, which include overlapping sections to which two gameplay spaces have been fitted.

FIG. 4 shows an example in which a first player 120-1 is playing the game 150 in CR2 while a second player 120-2 is playing the same game 150 in CR3. For example, player 120-2 may be ahead of player 120-1 in the game 150. As before, CR2 includes Sections 1, 2, and 3, and CR 3 includes Sections 1 and 2. Sections 1 and 2 are thus common to both CR2 and CR3. As shown, both players 120-1 and 120-2 are physically present in Section 2, but the two players may see entirely different scenes, with player 120-1 seeing a scene as rendered in CR2 and player 120-2 seeing a scene as rendered in CR3. Both players may thus be in the same physical place at the same time, while also being in different virtual spaces at different points in the game. The players might be aware of each other's physical presence, but they would not normally see each other's avatars (i.e., synthetic character representations), as the avatars may be arbitrarily far away from each other within the realm of the game.

Figure 5:
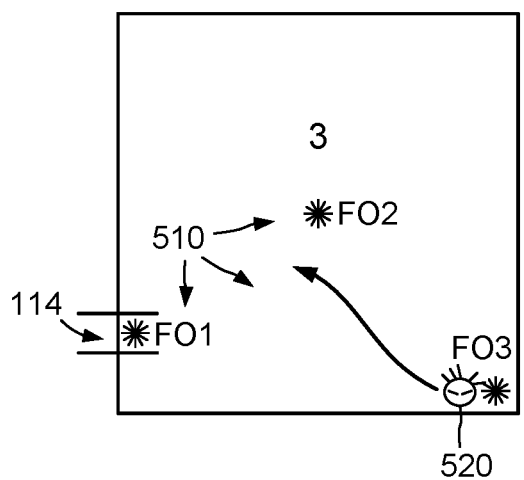
FIG. 5 is a top, plan view of an example section of the model of the physical environment, in which focal objects are used for placing virtual objects.

FIG. 5 shows examples of virtual object placement in greater detail. Here, CR1 (Section 3) is seen to include various focal objects 510, e.g., focal objects FO1, FO2, and FO3. As used herein, the term "focal objects" describes objects that form a virtual skeleton in which virtual objects may be placed and may provide orientation for those objects. For example, focal objects 510 are defined relative to features of a generalized room, e.g., as part of the game 150 rather than as part of any particular physical environment. The process of fitting the gameplay spaces to the model 160 may thus include associating focal objects 510 with actual features of the physical environment, such as an entryway, a center or centroid of a room, a far wall or corner, or the like. Such fitting may further include placing virtual objects of the gameplay space relative to the features associated with the focal objects 510.

In the example shown, focal object FO1 represents an entryway of a space and game 150 associates FO1 with entryway 114 of Section 3. Focal object FO2 represents a center of a space and is associated with the center of Section 3. Likewise, focal object FO3 represents a far-right corner of a space and is associated with the indicated corner of Section 3. In this manner, game 150 associates generically defined focal objects 510 with actual features of a gameplay space and proceeds to place virtual objects relative to those associated features. For example, game 150 may place a virtual object 520 that represents a ghost, which appears to emanate from FO3.

Focal objects 510 are not limited to points but may also include lines, planes, bounding boxes, or any other suitable shapes. Some examples of focal objects 510 may include the following:

Spawning focal point: Used to indicate where non-player characters will spawn.
Positioning focal point: Range-based or used in connection with model 160.
Repulsion Focal Point: A point to be avoided. Moving objects may experience a repulsive force depending on distance from a repulsive focal point.
Orientation focal point: Used to orient holograms within a group. Group objects may be placed first, then a centroid is calculated, and then all group objects are oriented with respect to that centroid (focal point).
"Sightline" Focal Line: Used to define the line of attack of game generated characters. It could also be used to determine where to place defenses against this attack to give a player a fighting chance.
Orientation Focal Line: Used to give objects an orientation relative to the specified line.
Plane: A focal plane could be used as a valid place to hang objects, e.g., a region instead of a point. May provide a place from which to shoot projectiles.

Bounding Volume: Used to define a region valid for static or dynamic placement of objects.

In some examples, focal objects 510 are arranged in a hierarchy. For example, a point focal object could be nested within a line focal object, which itself may be nested within a planar focal object or a bounding volume.

Figure 6A:
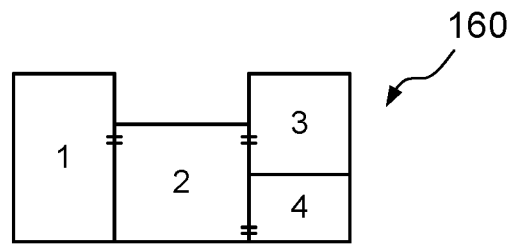
FIGS. 6a-6c are diagrams showing examples of transitions between gameplay spaces.
Figure 6A:
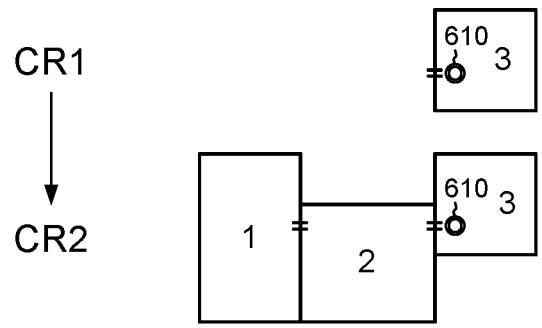
Figure 6B:
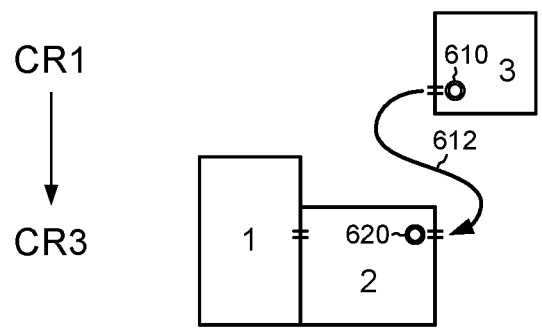
Figure 6C:
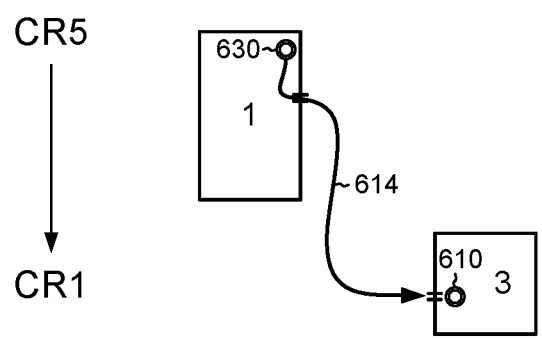

FIGS. 6a-6c show various examples of transitions from one gameplay space to another. Transitions define how the game 150 manages changes between gameplay spaces, e.g., via edges 220 (FIG. 2). We assume the same model 160 for this example as for the prior ones. The examples shown are not intended to show all possibilities. It should be noted that the transitions indicated here are for illustration and do not necessarily correspond to transitions permitted by the GCM 200.

In FIG. 6a, the game 150 manages a transition that does not require a player 120 to move to a different location within the physical environment 110. This example applies to transitions between equal CRs, i.e., ones that use the same section or sections, and cases where one CR is a proper subset of another. In FIG. 6a, the depicted transition is between CR1 and CR2, where CR1 is a proper subset of CR2. As both CR1 and CR2 include Section 3 of the model 160, the player 120 may remain in Section 3 during the transition. In some examples, the game 150 may prompt the player 120 to move to a designated location, such as that of a virtual portal 610. Once the player is standing in the portal, the game 150 may switch the scene from that of CR1 to that of CR2. The switch may be accompanied by simulated effects, such as spinning of the space around the player, simulating fog, fading out the scene of CR1 and fading in the scene of CR2, presenting a moving virtual tunnel, simulating teleportation, or the like. In some examples, the transition from CR1 to CR2 occurs spontaneously, without requiring the player to enter any portal 610. In yet other examples, the player is prompted to move to a different location during the transition. For example, desired gameplay may involve the player entering CR2 from a different location from the one from which the player exits CR1. Such transitions may be managed as described in the examples below.

In FIG. 6b, the game 150 manages a transition that requires a player 120 to move from one section 310 of the model 160 to an adjacent section of the model 160. For example, to achieve a transition from CR1 to CR3, as shown, the player may move from Section 3 to adjacent Section 2 via path 612. In an example, the game 150 manages the transition of FIG. 6b by prompting the player to enter a virtual portal 610. The game 150 may then display a virtual tunnel, an illuminated line, or the like, e.g., one that appears on the floor. The player is prompted to follow the tunnel or line, which may simply involve the player stepping through a passageway 114 to a similar portal 620 in Section 2. As the player moves from portal 610 to portal 620, the game 150 may display special effects to the player, e.g., spinning, fading, fog, etc.

FIG. 6c shows a similar arrangement as FIG. 6b, except that here the transition is from CR5 to CR1 and requires the player to move a longer distance, represented here by path 614. To achieve the transition, the game 150 may prompt the player to follow a tunnel or line, e.g., as described above. If the path 614 were to include stairs, the game may present a line on the stairs guiding the player along. In some examples, the game 150 presents animated scenes to the player, e.g., to maintain player engagement during the transition.

FIGS. 7a-7c show an example arrangement for managing transitions between an AR gameplay space 710 and a virtual realm 720. Here, the AR gameplay space 710 is like those described above, e.g., it allows players to see their physical surroundings while overlaying virtual objects, such that the players perceive the virtual objects as part of the environment. In some examples, the AR gameplay space 710 is capable of supporting coextensive realities. In the example shown, the environment is depicted as physical play area 730. In contrast with the AR gameplay space 710, which combines physical and virtual content, the virtual realm 720 is generally fully simulated.

In an example, the game 150 renders the virtual realm 720 coextensively with the AR gameplay space 710. For example, players standing in the AR gameplay space 710 can see into the virtual realm 720 and may be able to interact with virtual objects placed therein. Likewise, players in the virtual realm 720 may look back into the AR gameplay space 710 and interact with virtual objects therein.

To enter the virtual realm 720 from the AR gameplay space 710, a player 120 may walk to a delineated region 740, such as an identified space on the floor (e.g., a hologram of a glowing rectangle or other shape; see FIG. 7a). Once the player steps into the delineated region 740, the game 150 provides the player with an option to use VR control mode to explore the virtual realm 720. VR control mode may involve the player invoking a VR control console, realized for example as a set of holograms, and operating controls on the control console to move around the virtual realm 720 and interact with virtual objects rendered therein. In some examples, a handheld controller may be used in place of a virtual console for supporting VR control mode. Preferably, however, VR control may be implemented without any console or controller, but rather by using the player's own body as a controller, e.g., by translating weight-shifting and/or body positions to VR control commands. An example of this type of "VR Anywhere" control is described in the incorporated U.S. Pat. No. 10,503,351.

While using VR control mode, the player 120 preferably remains in one place within the delineated region 740. As the player operates VR controls to move and turn, the game 150 simulates motion of the player by moving and rotating the virtual realm 170 past and/or around the player in response to the player's input. As shown in FIG. 7b, the player 120 may virtually explore any part of the virtual realm 720, while the player's body physically remains stationary within the delineated region 740 and relative to the physical play area 730.

To maintain continuity between the virtual realm 720 and the AR gameplay space 710, the game 150 may render a virtual simulation 710v of the AR gameplay space 710, which maintains the geometrical relationship originally established between the virtual realm 720 and the AR gameplay space 710. In an example, rendering the virtual simulation 710v includes rendering a virtual simulation 740v of the delineated region 740. The player 120 can thus look back on the simulation 710v from within the virtual realm 720 and see the simulation 740v of the delineated region 740. The game 150 may render virtual objects of the AR gameplay space 710 within the simulation 710v, and such virtual objects may include avatars of other players at the same point in the game, whose physical bodies are located in the AR gameplay space 710.

When the player wishes to return from the virtual realm 720 back to the AR gameplay space 710, the game 150 may require the player to return to the point of origin into the virtual realm 720, i.e., to travel back to the virtual simulation 740v of the delineated region 740. The player may operate VR controls to return to and orient with respect to the virtual simulation 740v. At this point, the player's virtual position and orientation again matches the player's physical orientation and position. The player may then step out of the delineated region 740 and continue gameplay in the AR gameplay space 710.

To use an analogy, the delineated region 740 may be compared to a magic carpet. The player 120 can step onto the magic carpet from the AR gameplay space 710 and fly around on the magic carpet through the virtual realm 720. To return to the AR gameplay space 710 in a manner that maintains continuity, the player 120 may fly the magic carpet back to the simulated region 740v, which may be regarded as analogous to a parking space for the magic carpet. Once the magic carpet is parked in the parking space, such that the simulated region 740v overlaps and aligns with the delineated region 740, the player may step off the magic carpet and back into the AR gameplay space 710, where the player may resume normal play. It should go without saying that the analogies of the magic carpet and parking space are provided for ease of understanding and should not be taken literally. For example, the player 120 may never see anything that resembles a magic carpet or a parking space.

Although FIGS. 7a and 7b show only a single delineated region 740 and a single virtual realm 720, any number of such regions 740 and realms 720 may be provided. For instance, the AR gameplay space 710 may be surrounded by multiple virtual realms, e.g., one above, one below, one to the left, and one to the right. A delineated region 740 may be provided for each virtual realm 720 as a transit point into and out of that realm. In some examples, a single virtual realm 720 may completely surround the AR gameplay space 710. Such a virtual realm may include any number of delineated regions 740 providing respective transit points. For consistency, the game 150 may require players to reenter the AR gameplay space 710 through the same delineated regions (parking spaces) from which they exited.

Player control within the virtual realm 720 (or within multiple such realms) need not be limited to VR control mode. For example, as shown in FIG. 7c, the delineated region 740 may be large enough to allow for the player 120 to walk around the delineated region 740 without stepping out (e.g., as shown by path 750). In such examples the game 150 may allow the player 120 to use AR control mode within the virtual realm 720. Unlike VR control mode, which involves the player containing bodily movements to a small region, AR control mode uses the players own movements, positions, and gestures to effect corresponding movements and action over a larger scale in the virtual realm 720. For example, walking in AR control mode translates correspondingly to walking in the virtual realm 720. Likewise, turning in AR control mode translates to turning in the virtual realm, and most other body movements of the player translate to corresponding movements in the virtual realm. Examples of AR control mode are also described in the incorporated U.S. Pat. No. 10,503,351.

The ability to interact with virtual objects in the virtual realm 720 using AR control mode promotes exciting and natural-feeling gameplay. For example, it may be more enjoyable for a player to battle a virtual monster using natural body movements than by operating controls on a console. It is noted that the delineated region 740 need not be small. The player may thus be able to move around naturally inside the delineated region 740, with the player's movements translated to movements within the virtual realm and providing the player with a realistic-feeling experience.

In some examples, the game 150 provides the player with the option to use VR control or AR control, at the player's option. Typically, a player will need to use VR control at least some of the time, as the delineated region 740 is typically much smaller in apparent size than the virtual realm 720, such that the player cannot normally circumnavigate the VR realm solely by walking.

Figure 8:
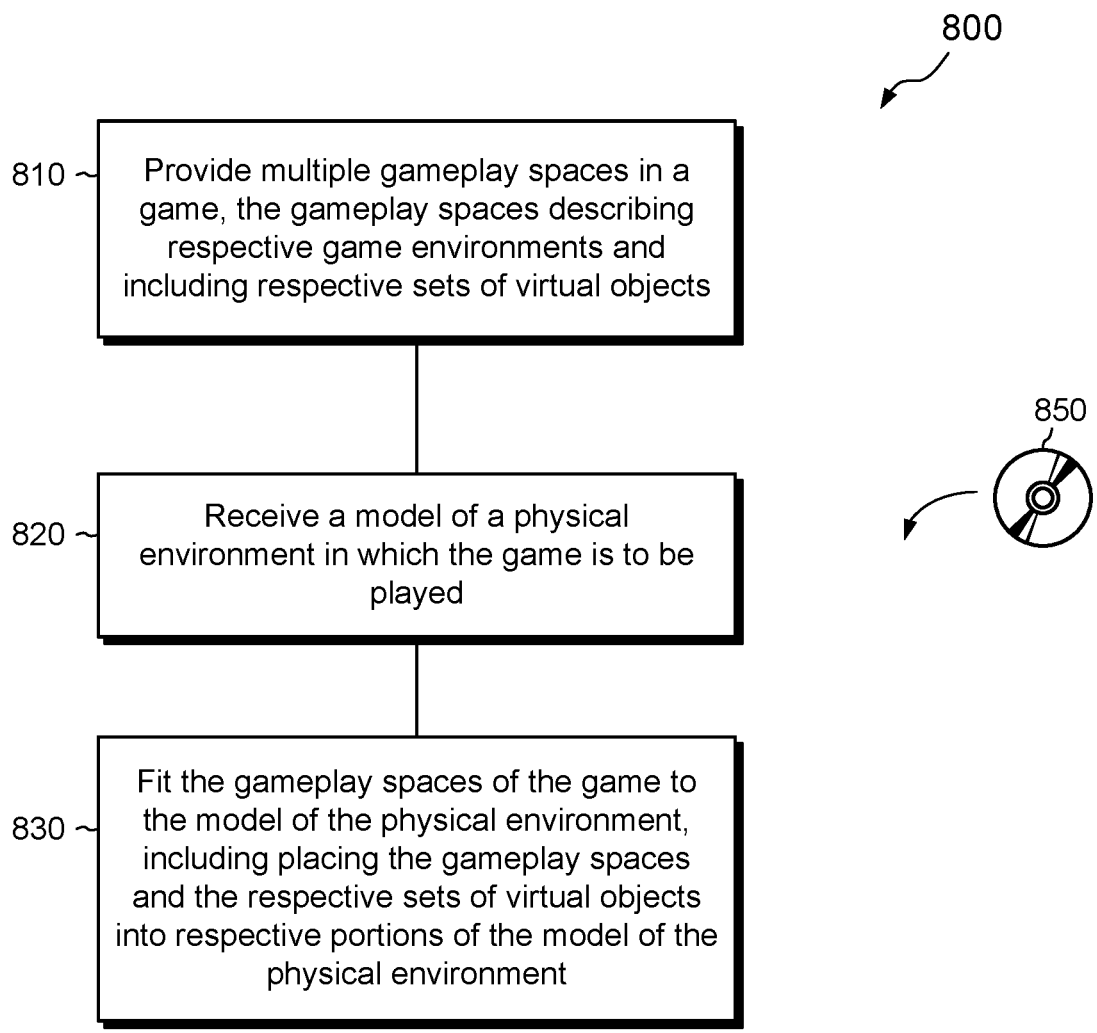
FIG. 8 is a flowchart showing an example method of implementing computerized games.

FIG. 8 shows an example method 800 of implementing computerized games and provides a summary of some of the features described above. The method 800 may be carried out, for example, by the server apparatus 110 described in connection with FIG. 1, operating in coordination with headsets 130 of respective players 120. The various acts of method 800 may be ordered in any suitable way. Accordingly, embodiments may be constructed in which acts are performed in orders different from that illustrated, which may include performing some acts simultaneously.

At 810, multiple gameplay spaces 210 are provided in a game 150. The gameplay spaces 210 describe respective game environments and include respective sets of virtual objects, such as holograms 116 and 118. The gameplay spaces 210 may be provided as parts of the game 150, which may be downloaded over a network and/or installed onto a computerized apparatus from software media.

At 820, a model 160 is received of a physical environment 110 in which the game 150 is to be played. The model 160 may include any number of sections 310, which may represent rooms or other areas of the physical environment 110.

At 830, the gameplay spaces 210 of the game are fitted to the model 160 of the physical environment 110. Such fitting may include placing the gameplay spaces 210 and the respective sets of virtual objects into respective portions of the model 160 of the physical environment 110, e.g., in respective combinations of the depicted sections 310.

An improved technique has been described for implementing computerized games. The technique includes providing multiple gameplay spaces 210 of a game 150 and receiving a model 160 of a physical environment 110 in which the game 150 is to be played. The technique further includes fitting the gameplay spaces 210 of the game 150 to the model 160, such as by placing the gameplay spaces 210 and their respective virtual objects into respective portions of the model 160.

Having described certain embodiments, numerous alternative embodiments or variations can be made. For example, embodiments have been described that involve a model 160 having multiple sections 310. However, embodiments may also be constructed using models 160 that have only a single section. Such a single section may be reused for realizing any number of gameplay spaces.

Also, embodiments have been described that involve one or more players at a single site. However, players at other sites may also participate. For example, a player at a first site may be represented as an avatar at a second site, and a player at the second site may be represented as an avatar at the first site. The game 150 may be actualized individually at the respective sites, with players at each site seeing analogous, but not necessarily identical, views of virtual objects.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as one or more computer program products each including one or more non-transient, computer-readable storage media, such as a magnetic disk, magnetic tape, compact disk, DVD, Blu-ray disk, optical disk, flash drive, solid state drive, SD (Secure Digital) chip or device, Application Specific Integrated Circuit (ASIC), Field Programmable Gate Array (FPGA), and/or the like (shown by way of example as medium 850 in FIG. 8). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of implementing computerized games, comprising:
    providing multiple gameplay spaces in a game, the gameplay spaces describing respective game environments and including respective sets of virtual objects;
    receiving a model of a physical environment in which the game is to be played, the model including a plurality of sections that represent distinct, respective rooms or spaces of the physical environment; and
    fitting the gameplay spaces of the game to the model of the physical environment, including placing the gameplay spaces and the respective sets of virtual objects into respective sections or groups of sections of the plurality of sections, at least two of the respective sections or groups of sections being at least partially distinct from each other.
2. The method of claim 1, wherein fitting the gameplay spaces to the model includes:
    placing virtual objects of a first gameplay space into a first set of the sections; and
    placing virtual objects of a second gameplay space into a second set of the sections; and
    wherein the method further comprises rendering the first gameplay space to a first player of the game while simultaneously rendering the second gameplay space to a second player of the game.
3. The method of claim 2, wherein the first set of the sections overlaps the second set of sections in at least one shared section.
4. The method of claim 3, wherein said at least one shared section includes a particular shared section, and wherein rendering the first gameplay space to the first player while simultaneously rendering the second gameplay space to the second player is performed while the first player and the second player are both physically present in a region of the physical environment represented by the particular shared section, such that the first player and the second player can see different gameplay spaces at the same time in the same shared section.
5. The method of claim 1, wherein the game provides an additional gameplay space having an additional set of virtual objects, and wherein the method further comprises:
    attempting to fit the additional gameplay space to the model of the physical environment; and
    in response to failing to fit the additional gameplay space to the model of the physical environment, rendering a VR version of the additional gameplay space, the VR version providing a player with a fully synthetic version of the additional gameplay space.
6. The method of claim 1, wherein fitting the gameplay spaces to the model includes placing virtual objects in accordance with a set of rules that specify relative positions of virtual objects.
7. The method of claim 6, further comprising specifying a set of focal objects in a gameplay space, the set of focal objects providing a skeleton on which virtual objects of the gameplay space can be placed.
8. The method of claim 7, wherein the set of focal objects is defined relative to features of a generalized room, and wherein fitting the gameplay spaces to the model includes (i) associating the set of focal objects with actual features of the physical environment and (ii) placing the virtual objects of the gameplay space relative to the features associated with the focal objects.
9. The method of claim 1, further comprising providing a transition between a first gameplay space of the game and a second gameplay space of the game, the transition providing an animated path for a player to follow from a first part of the physical environment in which the first gameplay space is rendered to a second part of the physical environment in which the second gameplay space is rendered.
10. The method of claim 1, wherein a gameplay space provided by the game includes a delineated region that provides a transit point for a player between the gameplay space and a virtual realm.
11. The method of claim 10, further comprising, while the player is physically disposed within the delineated region, responding to VR control input from the player to virtually move the virtual realm relative to the player, such that the player has the impression of moving through the virtual realm.
12. The method of claim 11, wherein virtually moving the virtual realm relative to the player includes moving (i) a virtual image of the gameplay space and (ii) a virtual image of the delineated region relative to the player.
13. The method of claim 12, further comprising:
    while the player is playing the game in the virtual realm, responding to VR control input from the player to virtually move the virtual image of the delineated region back to the delineated region; and
    once the virtual image of the delineated region has been moved back to the delineated region, receiving control commands from the player based on body position and movements of the player to move about the gameplay space off of the delineated region.

14. The method of claim 10, further comprising, while the player is physically positioned within the delineated region and is playing within the virtual realm, translating physical positions and movements of the player into control input within the virtual realm.

15. The method of claim 14, wherein translating physical positions and movements of the player into control input includes translating input indicative of the player walking within the delineated region to corresponding walking of the player within the virtual realm.

16. The method of claim 10, further comprising presenting images of the VR realm to the player while the player is disposed within the gameplay space, such that the player can see the VR realm from within the gameplay space.

17. A computerized apparatus, comprising a set of processors coupled to memory, the set of processors and the memory together forming control circuitry constructed and arranged to:
provide multiple gameplay spaces in a game, the gameplay spaces describing respective game environments and including respective sets of virtual objects;
receive a model of a physical environment in which the game is to be played, the model including a plurality of sections that represent distinct, respective rooms or spaces of the physical environment; and
fit the gameplay spaces of the game to the model of the physical environment, including placing the gameplay spaces and the respective sets of virtual objects into respective sections or groups of sections of the plurality of sections, at least two of the respective sections or groups of sections being at least partially distinct from each other.

18. A computer program product including a set of non-transitory, computer-readable media having instructions which, when executed by control circuitry of a computerized apparatus, cause the control circuitry to perform a method of implementing computerized games, the method comprising:
providing multiple gameplay spaces in a game, the gameplay spaces describing respective game environments and including respective sets of virtual objects;
receiving a model of a physical environment in which the game is to be played, the model including a plurality of sections that represent distinct, respective rooms or spaces of the physical environment; and
fitting the gameplay spaces of the game to the model of the physical environment, including placing the gameplay spaces and the respective sets of virtual objects into respective sections or groups of sections of the plurality of sections, at least two of the respective sections or groups of sections being at least partially distinct from each other.

19. The method of claim 1, wherein the physical environment is an environment of a player of the game.

* * * * *